United States Patent [19]

Robbins

[11] 4,248,512
[45] Feb. 3, 1981

[54] TWO-PART PHOTOSENSITIVE MEDIA REPLACEABLE CASSETTE SUPPLY DEVICE

[75] Inventor: Daniel H. Robbins, Rochester, N.Y.

[73] Assignee: Itek Corporation, Lexington, Mass.

[21] Appl. No.: 942,521

[22] Filed: Sep. 15, 1978

Related U.S. Application Data

[63] Continuation of Ser. No. 611,595, Sep. 8, 1975.

[51] Int. Cl.² ............................................. G03B 17/26
[52] U.S. Cl. ................................. 354/275; 242/197
[58] Field of Search ................ 354/174, 211, 275–279, 354/281, 282, 216; 352/72 R, 158, 78 R; 242/71 R, 71.1, 71.6, 197, 198; 226/49–51

[56] References Cited

U.S. PATENT DOCUMENTS

| 3,499,376 | 3/1970 | Swift | 354/211 |
| 3,620,152 | 12/1972 | Daury | 354/91 |
| 3,715,963 | 2/1973 | LeCover | 354/211 |
| 3,780,634 | 12/1973 | Van Osch | 242/71.6 X |
| 3,783,763 | 1/1974 | Whitely et al. | 354/211 X |
| 3,813,056 | 5/1974 | Hagen et al. | 352/72 X |

FOREIGN PATENT DOCUMENTS

| 591303 | 1/1934 | Fed. Rep. of Germany | 354/211 |
| 1232459 | 12/1967 | Fed. Rep. of Germany | 354/275 |

Primary Examiner—L. T. Hix
Assistant Examiner—William B. Perkey
Attorney, Agent, or Firm—Homer O. Blair; Robert L. Nathans

[57] ABSTRACT

A two-part replaceable cassette-like device is provided, having a disposable cassette portion and a light sealed buffer box, having a pair of drive rollers therein and which is detachably fastened to the disposable cassette, whereby the photosensitive material driven out of the cassette will be driven through the light sealed buffer box into a camera processor. Upon exhaustion of the photosensitive media within the cassette, the buffer box is removed from the cassette for reuse and the cassette is thrown away.

3 Claims, 1 Drawing Figure

U.S. Patent            Feb. 3, 1981            4,248,512
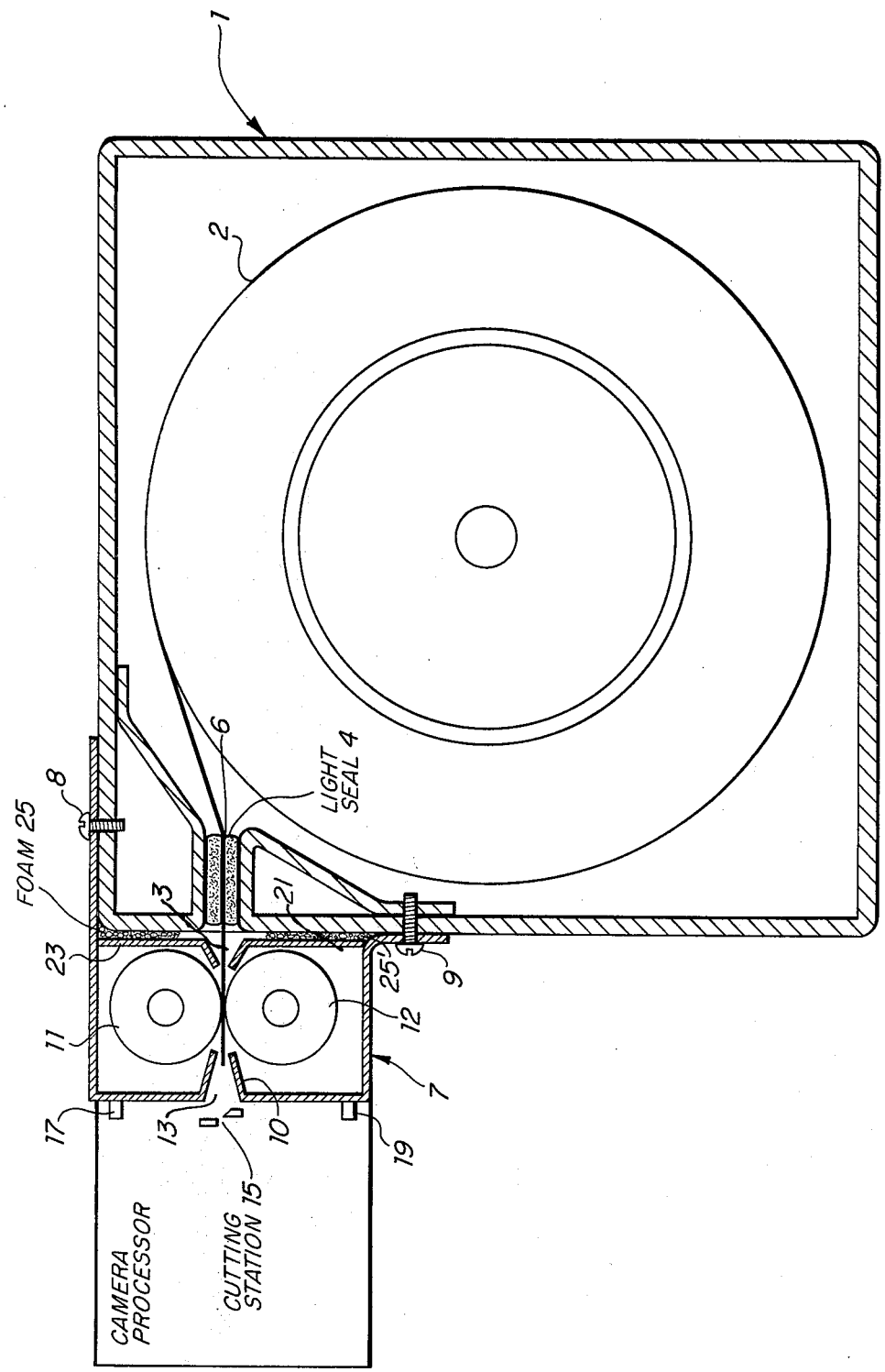

TWO-PART PHOTOSENSITIVE MEDIA REPLACEABLE CASSETTE SUPPLY DEVICE

This is a continuation of application Ser. No. 611,595, filed Sept. 8, 1975.

BACKGROUND OF THE INVENTION

This invention relates to the field of cassette-like devices containing photosensitive film for use in connection with industrial cameras.

In accordance with a first prior art approach, a cassette is provided containing a roll of photosensitive media. The film is driven from the cassette by a pair of rollers external to the cassette and within the camera. One problem with this type of approach is that the lead end becomes fogged when the cassette is removed from the industrial camera since the lead end must always be present external of the cassette. Should this not occur, it would be impossible to drive the photosensitive media out of the cassette by means of the external rollers upon subsequent use of the cassette.

Another approach is to provide a pair of rollers within the cassette which are capable of eliminating the above-mentioned problem of fogging as the leader may be driven totally within the cassette and thereafter driven out again. This approach, however, is costly since the rollers, being inside the cassette, are thrown out when the cassette is disposed of upon the exhaustion of the photosensitive media therein.

Furthermore, through the use of both of these approaches, it is possible that the film may be driven by error all the way into the cassette (in the second approach beyond the "bite" of the roller pair) so that the media cannot be thereafter driven out of the cassette to thereby waste the remaining material therein.

It is thus highly desirable to provide a replaceable cassette-like supply device wherein the roller portion associated therewith is preserved for use with subsequent disposable cassettes in the interest of economy and the material is not fogged due to the elimination of the extended lead edge.

SUMMARY OF THE INVENTION

In accordance with a preferred embodiment of the invention, a disposable cassette containing photosensitive material is detachably coupled to a light tight buffer box having a pair of drive rollers therein. This two-part supply device is inserted into an industrial camera. The material is pushed from the disposable cassette through the light tight buffer box into the camera for use therein. If it is desired to replace one type of photosensitive material with another before the material in the cassette is used up, the photosensitive material extending from the buffer box drive rollers to the cutting station in the camera processor is driven back into the bite of the roller pair so that the leader is not exposed to light entering the buffer box through the buffer box exit orifice, and the two-part unit is thereafter removed and replaced with a similar two-part unit bearing a different type of material. When the photosensitive material in any two-part unit becomes exhausted, the reusable buffer box is unfastened from the disposable cassette, and the disposable cassette is thereafter thrown away and the buffer box is reused with a fresh cassette. This two-part unit functions to overcome the above-stated problems of the prior art and yields the above-stated advantages.

Other objects, features, and advantages of the present invention will become apparent upon the perusal of the following detailed description taken in conjunction with the sole FIGURE.

DETAILED DESCRIPTION

The two-part replaceable supply device includes disposable cassette 1 containing a roll of photosensitive material 2 having a leader portion 3 which extends through light seal 4 positioned within exit orifice 6. Light tight buffer box 7 is detachably fastened to disposable cassette 1 by, for example, screws 8 and 9. Pins seated in holes, or other fasteners may obviously be utilized for this purpose. Rollers 11 and 12 are capable of driving the leader 3 through buffer box exit orifice 13 to cutting station 15 positioned within the camera processor. Locating pins 17 and 19 extending from the buffer box may be provided for positively locating exit orifice 13 with respect to cutting station 15 and for detachably fastening the buffer box to the cutting station 15, as shown in the FIGURE. Light seals 21 and 23 may be positioned as shown to prevent light entering through orifice 13 from fogging leader 3.

After a number of exposures are made within the camera processor, it is often desirable to substitute a second type of photosensitive material in place of material 2 in the above-mentioned disposable cassette, even though the supply within cassette 1 is not exhausted. Rollers 11 and 12 are rotated to drive the material extending into the camera processor to cutting station 15 back to the bits of rollers 11 and 12 so that the leading edge is positioned at the bite but is not driven beyond the bite or all of the way through light seal 4. The two-part unit is thereafter removed from the camera processor, and a similar two-part unit containing a different type of photosensitive material is inserted into the camera processor, and a similar procedure is carried out as set forth hereinabove.

Since the leading edge of the leader 3 is preferably driven fairly close to the bite of rollers 11 and 12, light entering orifice 13 does not fog substantial portions thereof. The leader portion between the bite of rollers 11 and 12 and light seal 4 is not fogged since light entering orifice 13 is blocked by tapered portions 10, and rollers 11 and 12. The inside walls of the buffer box preferably bear a light absorbing coating to further prevent fogging. Thus, upon the removal of any particular two-part unit, no fogging occurs. Foam members 25 and 25' positioned between box 7 and cassette 1 as shown further prevent fogging.

When the material is exhausted in the disposable cassette of any two-part unit, detachable fasteners, e.g., screws 8 and 9, are actuated to detach buffer box 7 from disposable cassette 1 so that the disposable cassette may be thrown away, and the buffer box containing the roller pair may be reused with a fresh cassette, thereby to result in cost savings, in contrast with cassettes having rollers built therein. Furthermore, since rollers 11 and 12 are positioned within the buffer box, it is impossible to inadvertently drive leader 3 all of the way into cassette light seal 4, thereby to prevent the waste of a cassette containing a remaining amount of photosensitive media.

An important subsidiary aspect of the invention is the positioning of light seal means such as seals 21 and 23 away from buffer box orifice 13. This arrangement enables the use of a buffer box exit orifice which does not require light seals therein, similar to cassette light seal 4. This is important since the leader must be driven back and forth through orifice 13 during the insertion and replacement cycles of any particular two-part supply device.

In summary, the above-mentioned two-part supply device provides significant advantages relative to the prior art. There is no material loss due to fogging of leader portions; there is no loss of film through inadvertent reversal of film drive rollers; cost and material savings are had by minimizing the disposable portion of the container; and multiple material capability is obtained by providing several buffer boxes along with each camera.

The terms "light sealed" and "light seal means" used in connection with "buffer box" are intended to cover not only discrete felt or foam members but is intended to include any means for preventing or substantially reducing fogging of photosensitive material therein. For example, rollers 11 and 12 may function to block light from film portion 3 and/or the inside of the buffer box may have a black coating thereon for absorbing light to prevent light from fogging film portion 3.

The invention should be limited only as required by the scope of the following claims.

What is claimed is:

1. In combination:
    a. a camera;
    b. an additional two-part photosensitive material replaceable supply device for said camera including:
        b-1. a disposable cassette containing said photosensitive material;
        b-2. a cassette exit orifice for permitting said photosensitive material to be transported out of said disposable cassette;
        b-3. first light seal means associated with said disposable cassette for preventing light from fogging said material therein;
        b-4. a reusable light sealed buffer box;
        b-5. means for detachably fastening said light sealed buffer box to said disposable cassette to permit reuse of said buffer box and at a position thereon so that photosensitive material driven through said cassette exit orifice may be further driven through said buffer box into an exposure station of said camera;
        b-6. drive means associated with said light sealed buffer box for driving said photosensitive material emanating from said disposable cassette through said buffer box and into said camera in a first direction and for driving said photosensitive material in a second direction opposite said first direction until the leading edge thereof is close to but not beyond the bite of said drive means; and
    c. means for detachably coupling said two-part replaceable supply device to said camera.

2. The combination as set forth in claim 1 wherein said buffer box further includes a buffer box exit orifice together with light seal means within said buffer box positioned away from said buffer box exit orifice for preventing fogging of said photosensitive media in said buffer box and yet not interfering with movement of said media in and out of said buffer box.

3. A method of manipulating photosensitive material for use in a camera comprising the steps of:
    a. providing a two-part replaceable supply device in addition to said camera which includes:
        a-1. a disposable cassette containing said photosensitive material;
        a-2. a cassette exit orifice for permitting said photosensitive material to be transported out of said disposable cassette;
        a-3. first light seal means associated with said disposable cassette for preventing light from fogging said material therein;
        a-4. a reusable light sealed buffer box;
        a-5. means for detachably fastening said light sealed buffer box to said disposable cassette to permit reuse of said buffer box and at a position thereon so that photosensitive material driven through said cassette exit orifice may be further driven through said buffer box into an exposure station of said camera; and
        a-6. drive means associated with said light sealed buffer box for driving said photosensitive material emanating from said disposable cassette through said buffer box and into said camera in a first direction and for driving said photosensitive material in a second direction opposite said first direction until the leading edge thereof is closed to but not beyond the bite of said drive means;
    b. attaching said two-part replaceable supply device to said camera to enable the photosensitive material within said disposable cassette to be driven into said camera through said buffer box;
    c. driving said photosensitive material back into said buffer box in said second direction opposite said first direction until the leading edge thereof is close to but not beyond the bite of said drive means before the removal of said two-part replaceable supply device from said camera;
    d. thereafter removing said two-part replaceable supply device from said camera when it is desired to replace one type of photosensitive material with another type;
    e. later reusing said two-part replaceable supply device until said photosensitive material within said disposable cassette is exhausted;
    f. removing said two-part replaceable supply device from said camera; and
    g. removing sid detachable buffer box from said disposable cassette to provide for reuse of said buffer box with another disposable cassette.

* * * * *